May 12, 1959     H. J. PRESCOTT     2,886,177

FILTER HEADS

Filed Dec. 13, 1955

INVENTOR.
HENRY J. PRESCOTT
BY

United States Patent Office 2,886,177
Patented May 12, 1959

2,886,177

FILTER HEADS

Henry J. Prescott, Springfield, Mass.

Application December 13, 1955, Serial No. 552,889

1 Claim. (210—292)

This invention is concerned with devices known as filter heads which are used particularly with sand-gravel type water filters.

Heretofore, filter heads have been unable to be used efficiently when the backwash or cleaning of the filter tank is desired. The filter heads known prior to this invention have been made of materials that have been sensitive to acids in the water and have changed their characteristics after a period of filtration. Also the type of filters used prior to this invention have been of a fixed type, not allowing for adjustment or change of size. They have not been designed to distribute the water equally through the orifice in the head.

It is an object of the within invention to provide a simple construction of a filter head that will operate efficiently during a backwash or cleaning operation of the filter tank.

It is another object of the within invention to provide a filter head that is made of a material that is impervious to acids and particularly adaptable to waters having sulphur and soluble components in it.

It is yet another object of the within invention to provide a filter head that has an adjustable peripheral orifice. Whereas the filter head made of some materials cannot be sealed by a solvent, the filter head of the within invention may be when desired sealed by a solvent.

A still additional object of the within invention is to provide a filter head designed that will equally distribute the water through its orifice.

These and other objects are obtained by the use of a filter head having a main body portion with a cap that is adjustable upon an upper stem to which it is secured by threads. Within the body and beneath the cap are a plurality of orifices which lead into a central opening that runs downwardly through the main body. The filter head is made of a special plastic that has 6 to 8% rubber.

For a more detailed description and a better understanding of the invention, reference is made to the following specification:

Figure 1:
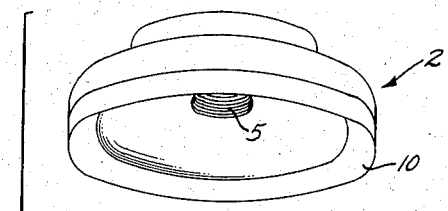
Figure 1 is an exploded view in perspective of the filter head.
Figure 3:
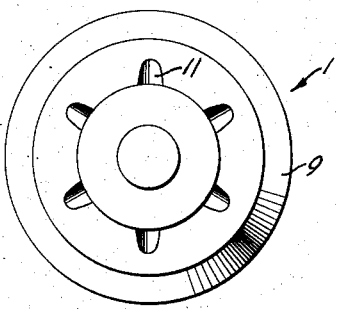
Figure 3 is a top view of the main body.
Figure 4:
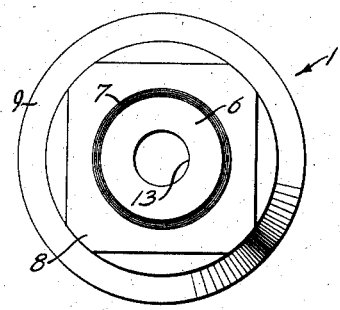
Figure 4 is a bottom view of the main body.
Figure 2:
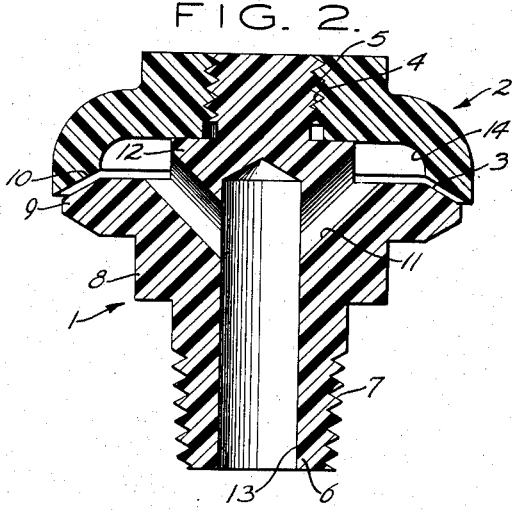
Figure 2 is a cross sectional view of the filter head with the cap in operating position.
Figure 5:
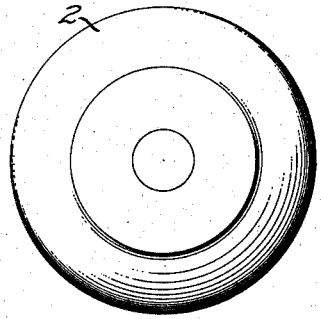
Figure 5 is a top view of the device with the cap in position over the main body.

The main body 1 comprises five particular portions. The lower portion 6 is threaded and is designed to fit above the run off at the bottom of a filter bed tank. The threads 7 are for screwing the filter head down into the said run off bed. Above the lower body 6 is a spacer 8. From a bottom view it may be seen that the spacer 8 is square shaped although it could be hexagonal or some other equivalent geometrical pattern. Above the spacer 8 is the circular flange 9. With the cap 2 down on the main body, the extremities 10 of the cap 2 create a very small opening with the flange 9. This opening is referred to as 3. It is between .016 and .018 inch in size.

Above the flanges 9 are the plurality of orifices 11. These orifices 11 are in the reduced portion 12. These orifices 11 connect with the opening 13 that runs down through the lower portion of the filter head. Above the reduced portion 12 is the threaded top 4 of the main body 1.

The cap 2 has threads 5 which engage the threads of the top 4 of the body 1.

It is to be noted that between the orifices 11 and the passage way 3, between the flanges 9 and 10, there is created between the cap 2 and the main body 1, a hollow area 14. This area is caused first by the shape of the cap 2 which is concave; and by the shape of the reduced portion 12 which is at right angles to the flange 9 of the main body 1.

In operation, the water passes through the narrow opening 3 between the flanges 9 and 10 to the hollow portion 14. From the hollow portion 14, it passes into the orifice 11 which connects with the central opening 13 which connects to the run off in the filter tank. The opening 3 is between .016 and .018 inch in size. Accordingly, all deleterious matter or foreign substances which have been able to penetrate through the sand and gravel will not be able to gain admittance through such a narrow orifice. It is also apparent that because of the threads on the top 5 which engage the top 4 of the main body 1 the opening between the flanges 9 and 10 may be varied and that the size may be increased to a greater amount than the aforementioned dimensions.

Since the filter head is made of a plastic with a rubber base, it will not corrode and will not stop up. Further because of the adjustable feature, if for some reason matter does plug up the openings, the cap 2 may be removed and the filter head cleaned out. This, of course, gives the filter head an infinite life.

I claim:

In a device for filtering fluids, a lower body portion and an upper cap portion engaging said body portion in adjustable relation therewith, said body portion including a lower cylindrical portion having a central bore formed therein, an annular flange joined to said lower cylindrical portion and having a plurality of diagonal passages formed therein, said diagonal passages communicating with said central bore, and a reduced portion joined to said annular flange and including an upwardly projecting threaded portion, said cap being formed with an inverted dished body having a threaded opening formed centrally therein for receiving said upwardly projecting threaded portion, said cap thereby being vertically adjustable with respect to said body portion, the peripheral edge of said dished body being spaced from said annular flange and defining an adjustable annular inlet opening therewith, and a continuous annular chamber being defined by the underside of the dished body, the side wall of said reduced portion and the upper surface of said annular flange, said continuous annular chamber communicating with said inlet opening and said diagonal passages for directing fluid into said diagonal passages.

References Cited in the file of this patent

UNITED STATES PATENTS

| 1,407,397 | Evans | Feb. 21, 1922 |
| 1,470,290 | Ryan | Oct. 9, 1923 |

FOREIGN PATENTS

| 919,408 | Germany | Nov. 22, 1954 |